United States Patent

Altenpohl

[15] 3,642,130
[45] Feb. 15, 1972

[54] MODULAR WEIGHT-SORTING ASSEMBLY FOR CONVEYORS

[72] Inventor: Paul J. Altenpohl, Bryn Mawr, Pa.
[73] Assignee: W. F. Altenpohl, Inc.
[22] Filed: May 28, 1969
[21] Appl. No.: 828,606

[52] U.S. Cl. .................................................. 209/121
[51] Int. Cl. ............................................ B07b 13/08
[58] Field of Search ....................... 198/39, 177; 209/121

[56] References Cited

UNITED STATES PATENTS

| 1,220,922 | 3/1917 | Winningham | 209/121 |
| 3,272,331 | 9/1966 | Thiele et al. | 209/121 X |
| 1,986,420 | 1/1935 | Webb et al. | 198/177 X |
| 2,967,081 | 1/1961 | Kleinpenning | 198/177 X |

*Primary Examiner*—Richard E. Aegerter
*Assistant Examiner*—Douglas D. Watts
*Attorney*—Clarence A. O'Brien and Harvey B. Jacobson

[57] ABSTRACT

Sorting of poultry suspended by carriers from a moving overhead conveyor chain, is accomplished by weighing apparatus constituting a unitary assembly adjustably installed at any desired location in the conveyor system. A fluid-operated lifter engages the release arms on the poultry carriers to effect removal of poultry from the conveyor. The assembly is provided with facilities to maintain operational alignment and prevent malfunction because of carrier displacements.

25 Claims, 8 Drawing Figures

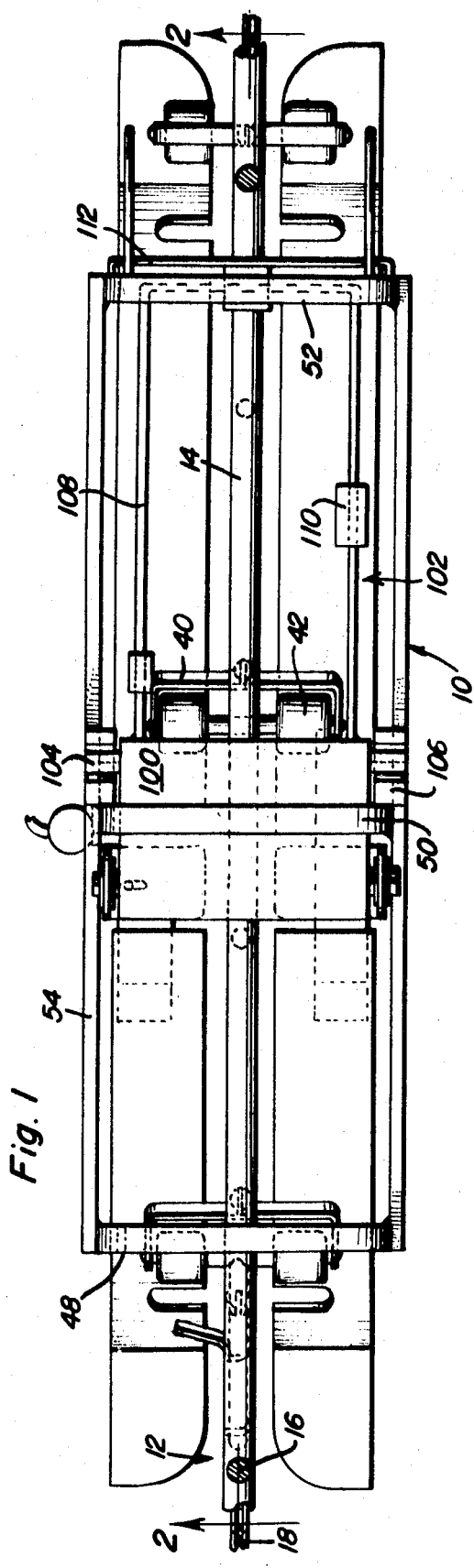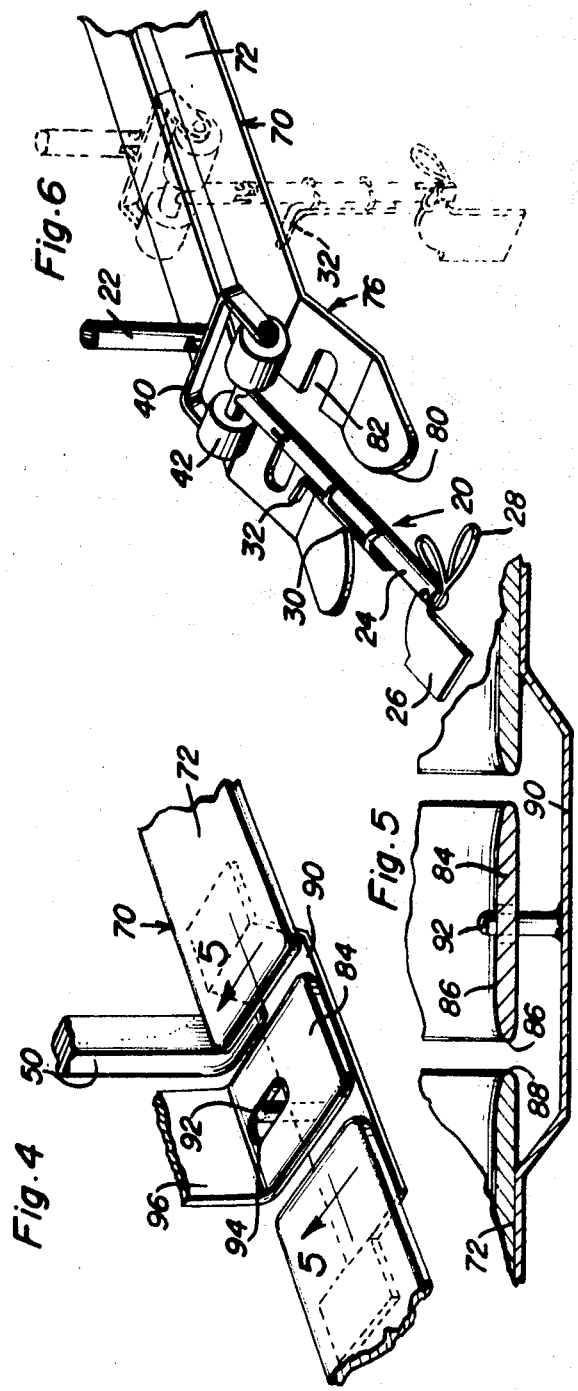
Fig. 1
Fig. 4
Fig. 5
Fig. 6
Paul J. Altenpohl
INVENTOR.

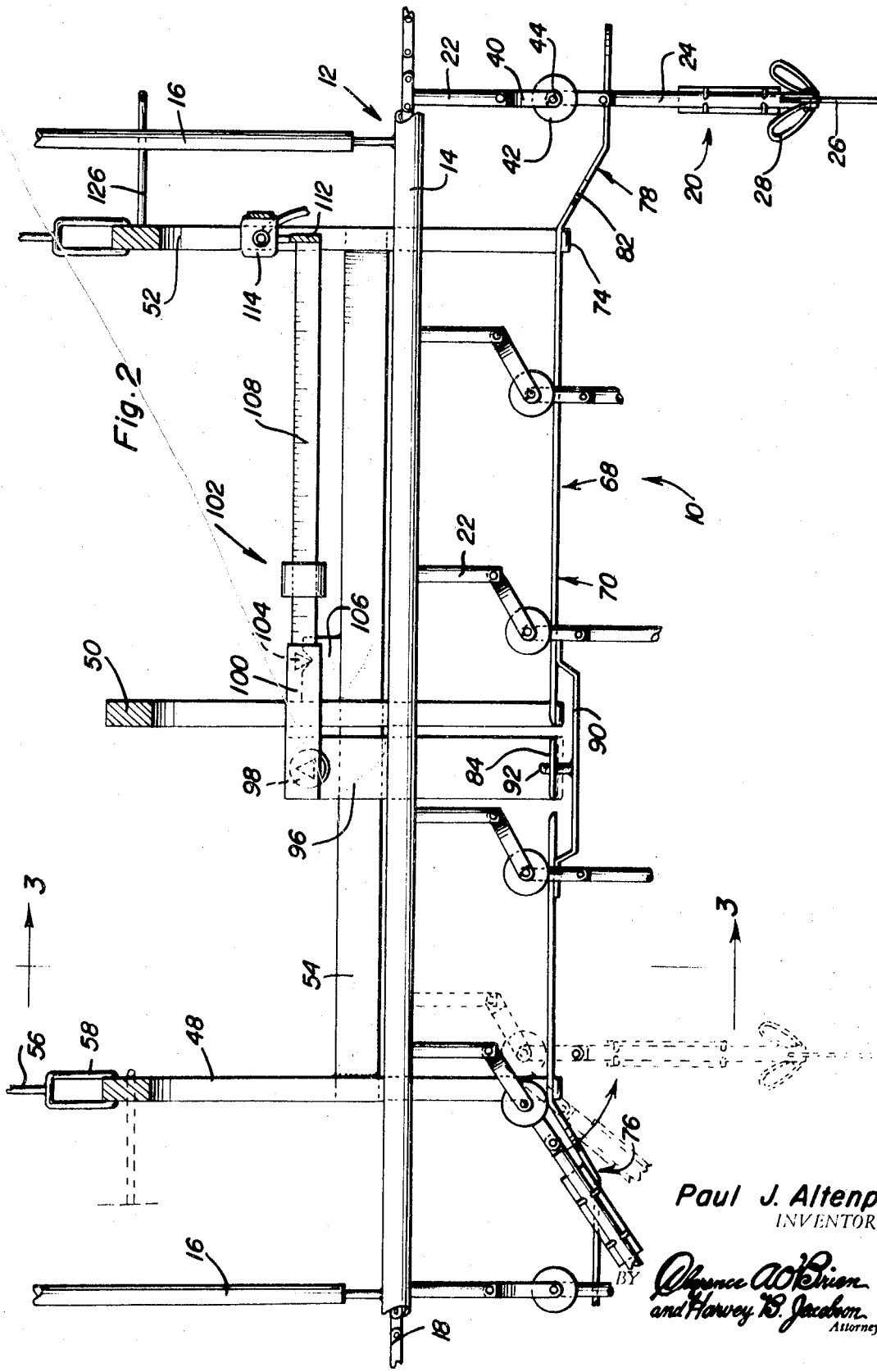

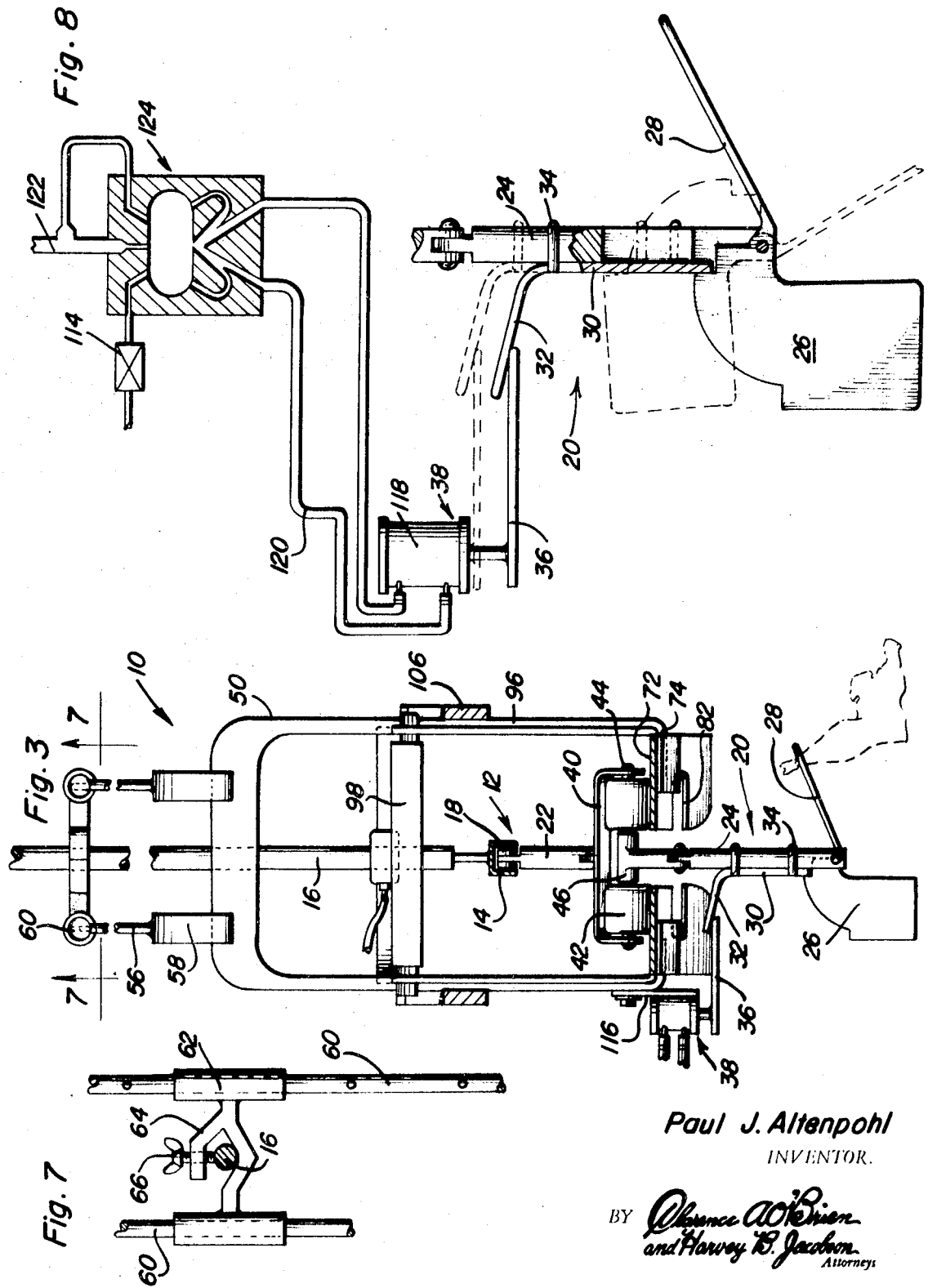

MODULAR WEIGHT-SORTING ASSEMBLY FOR CONVEYORS

This invention relates to automatic weight-sorting apparatus and more particularly to the sorting of poultry according to weight by automatic removal from a continuously moving, overhead conveyor.

Overhead conveyor systems from which poultry is suspended by releasable poultry carrier assemblies, are well known as well as cooperating weighing apparatus at sorting or sizing stations through which the poultry is carried by the conveyor system. The weighing apparatus at such stations are generally structurally interrelated with the conveyor system and involves costly installation in view of different requirements as to performance and installation. Further, such weight sorting conveyor systems require frequent adjustments in order to maintain satisfactory performance.

An important object of the present invention, therefore, is to provide a modular type of weight-sorting assembly capable of being installed in a standard poultry conveyor system as either original equipment or to expand the utility of an existing conveyor system at a minimum installational cost. As a further object, the modular weight-sorting assembly embodies various improvements which both facilitate installation as well as to reduce sources of malfunction and maintenance problems.

In accordance with the present invention, the modular weight-sorting assembly is supported by a plurality of interconnected frame members which are adjustably suspended in straddling relation to an existing standard overhead poultry conveyor. The vertical load of each poultry carrier being moved along by the overhead conveyor, is transferred to a track assembly supported by the frame members below the overhead conveyor, the track assembly having vertically inclined approach and departure sections provided with laterally extending notches arranged to accommodate untangling of poultry carriers insuring that they are in a proper operative position when traversing a gap in the track assembly occupied by a vertically movable track section. The vertically movable track section forms part of a weighing device pivotally mounted by one of the frame members and provided with a pair of elongated scale beams which extend generally parallel to the conveyor. This dual-beam arrangement permits weight adjustments in different ranges and/or in accordance with different measuring systems. Also, a fluid-operated lifter is provided for engagement with the release arms on the poultry carrier, operation of the lifter being controlled and triggered by a fluidic amplifier type of system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a modular weight-sorting assembly constructed and installed in accordance with the present invention.

FIG. 2 is a side sectional view taken substantially through a plane indicated by section line 2—2 in FIG. 1.

FIG. 3 is a transverse sectional view taken substantially through a plane indicated by section line 3—3 in FIG. 2.

FIG. 4 is a partial perspective view of a portion of the track associated with the modular weight sorting assembly.

FIG. 5 is an enlarged partial sectional view taken substantially through a plane indicated by section line 6—6 in FIG. 4.

FIG. 6 is a partial perspective view of another portion of the track arrangement.

FIG. 7 is an enlarged partial sectional view taken substantially through a plane indicated by section line 7—7 in FIG. 3.

FIG. 8 is a partial side elevational and schematic view of the release mechanism associated with the apparatus of the present invention.

Referring now to the drawings in detail, FIGS. 1, 2 and 3 illustrate a weight-sorting assembly generally denoted by reference numeral 10, installed in operative relation to a standard overhead conveyor which is generally denoted by reference numeral 12. The conveyor includes an elongated channel member 14 which is supported in a generally horizontal position by a plurality of vertical columns 16 which may be suitably suspended from a ceiling structure (not shown). The channel member 14 encloses a moving conveyor chain 18 from which a plurality of poultry carrier assemblies 20 are pivotally suspended by downwardly extending suspension links 22.

As more clearly seen in FIGS. 3 and 8, one exemplary embodiment of the poultry carrier assembly 20 includes a carrier shaft 24 pivotally mounting at its lower end, a carrier plate 26 integral with a bird hook 28. The bird hook 28 as illustrated is held in an upwardly inclined position by latching of the carrier plate 26. The carrier plate 26 is thus engaged by a latch bar 30 having a release arm 32 extending laterally therefrom at its upper end. The latch bar is slidably mounted for vertical movement on the carrier shaft 24 by means of guide rings 34. Upward displacement of the latch bar 30 will therefore release the poultry from the carrier assembly 20.

It will be apparent, that poultry is removed from a carrier assembly when the release arm 32 is displaced upwardly by means of a lifter element 36 associated with an operational control means 38 mounted by the weight sorting assembly 10 as will be hereafter explained in further detail. The carrier assembly is pivotally suspended from the suspension links 22 by means of clevis pulling links 40 pivotally connected to the lower ends of the suspension links 22. A pair of rollers 42 are rotatably mounted between the laterally spaced arms of the clevis pulling link 40 by means of an axle 44. The rollers 42 are spaced apart by a spacer sleeve 46 as more clearly seen in FIG. 3 to which the carrier shaft 24 is pivotally connected below the rollers.

The various parts of the weight sorting assembly 10 are supported by a frame assembly which consists of a plurality of frame members 48, 50 and 52 which in the illustrated embodiment, have an inverted U-shaped configuration. The opposite parallel sides of the frame members are interconnected by a pair of stringers 54 to form a rigid assembly. The frame members are similar in construction and although three are shown in the illustrated embodiment, it will be appreciated that any other number of such frame members may be utilized dependent upon the length and strength requirements of the assembly. Also, in the illustrated embodiment, the end frame members 48 and 52 are provided at the upper ends thereof with a pair of hangers 56 as more clearly seen in FIGS. 2 and 3 by means of which the assembly 10 is adjustably supported. The hangers 56 are provided at their lower ends with clevis hooks 58 secured to the end frame members while the upper ends of the hangers are secured at adjusted locations to a pair of parallel spaced rods or pipes 60 as more clearly seen in FIG. 7. The rods 60 are supported in generally horizontal positions parallel to and above the conveyor 12 by means of tubular sleeves 62 secured to clamp members 64. The clamp members as shown in FIG. 7, are locked in vertically adjusted positions to the conveyor-supporting columns 16, by means of setscrews 66.

Referring now to FIG. 2 in particular, it will be observed that the frame members support at their lower ends, a track arrangement generally referred to by reference numeral 68 which includes a generally horizontal, load-supporting track portion 70 disposed generally parallel to the conveyor 12. The load supporting track portion 70 includes a pair of laterally spaced track sections 72 as more clearly seen in FIG. 3, which are connected as by welding to the lower inturned ends 74 of the frame members at the ends of the track portion 70 and intermediate the ends as shown in FIG. 2. Connected to the ends of the track portion 70 are downwardly inclined approach and departure portions 76 and 78, which are continuations of the track sections 72. As more clearly seen in FIG. 6, the confronting edges of the track sections associated with the approach portion 76 are curved at 80 for transitionally guiding the carrier assemblies 20 into the space between the laterally spaced track sections 72. The confronting edges of the track sections associated with the approach and departure portions are also provided with laterally extending notches 82 which permit untangling of the carrier assemblies as will be explained.

Referring now to FIGS. 2 and 6, it will be apparent that the poultry carrier assemblies 20 are supported solely from the conveyor until the rollers 42 engage the vertically inclined approach portion 76 of the track arrangement. The load of the carrier assembly is thereby gradually transferred to the track portion 70 and then gradually removed therefrom as the rollers move down the departure portion 78. While moving along the track portion 70, the carrier assemblies are pulled along the track sections through the clevis links 40 while the portion of the carrier assembly below the rollers depend from the track arrangement between the track sections 72. With the carrier assemblies properly positioned, the lifter arms 32 will be disposed below the horizontal track portion 70 in proper position for engagement by the lifter element 36 hereinbefore referred to. However, occasionally, because of tangling between adjacent carrier assemblies, the release arm 32 of a carrier assembly rides on top of a track section when the carrier engages the approach portion 76 as shown by solid line in FIGS. 2 and 6. It will therefore be apparent that as the improperly positioned carrier moves upwardly along the approach portion 76, and the release arm 32 reaches the notch 82, the carrier assembly is permitted to swing downwardly into a proper position as shown by dotted line in FIG. 6. This tangle-free arrangement of the approach portion of the track arrangement thereby removes a frequent cause of malfunction.

Referring now to FIGS. 2, 4 and 5, it will be noted that each of the track sections 72 associated with the horizontal track portion 70 is discontinuous so as to form a gap occupied by vertically movable track sections 84. The vertically movable track sections are normally held in a position with the upper roller-supporting surfaces 86 disposed in a common plane with the supporting surfaces of the track sections 72. In order to reduce friction, the closely spaced confronting edges 86 and 88 of the movable track sections 84 and the track sections 72 are rounded to converge downwardly from the common surface plane as more clearly seen in FIG. 5. Also, the stationary track sections 72 are interconnected by jumper elements 90 which extend below the gap occupied by the movable track sections 84 to thereby limit downward movement as well as to establish structural continuity of the load-supporting track portion 70. Also, extending upwardly from one of the jumper elements 90 is a limit pin 92 projecting through a lateral slot 94 formed in one of the vertically movable track sections 84 in order to limit its lateral displacement relative to the stationary track portion 70. Thus, excessive movement of the movable track sections are prevented in order to avoid damage to the scale mechanism with which the vertical track sections are associated.

The vertical track sections 84 are connected to the lower ends of a pair of vertical scale members 96, the upper ends of which are interconnected by a pivot beam 98 which is connected to the pivot member 100 of a weighing scale generally referred to by reference numeral 102. The pivot member is provided with a pair of laterally extending fulcrum elements 104 as shown in FIGS. 1 and 2, pivotally supported by fulcrum blocks 106 secured as by welding to the stringers 54. A pivotal axis for the weighing scale is thereby established which is generally horizontal and perpendicular to the direction of travel of the overhead conveyor chain and spaced thereabove. Thus, a pair of scale beams 108 extend from the pivot member 100 in a direction generally parallel to the direction of conveyor travel as compared to the usual lateral extension of scale beams from the weighing station in prior art arrangements. The scale beams 108 therefore do not occupy any additional space and also provide facilities for adjusting the weight limit within different weight ranges and/or in accordance with different measuring systems. Thus, each scale beam is provided with a sliding adjusting weight 110. The ends of the scale beams remote from the pivot member 100, are interconnected by an actuating bar 112 located adjacent to the end frame member 52 in operative alignment with a trigger valve mechanism 114 mounted in proper position on the end frame member for engagement by the bar 112 as more clearly seen in FIG. 2. It will be apparent therefore, that when a carrier assembly exceeding a weight limit preset by the positioning of the adjusting weights 110 on the scale beams, moves onto the vertically movable track sections 84, the pivot member 100 of the weighing scale will pivot counterclockwise as viewed in FIG. 2 so as to upwardly displace the actuating bar 112 into engagement with the triggering valve mechanism 114. Actuation of the triggering valve mechanism renders the operational control 38 operative to upwardly displace the lifter element 36 as aforementioned in order to cause release of a bird from the poultry carrier assembly 20 as hereinbefore described.

The operational control 38 as shown in FIG. 3, is mounted on the intermediate frame member 50 by means of a bracket 116 on a side of the frame member toward which the release arms 32 of the carrier assemblies project opposite the direction in which the bird-carrying hooks 28 project. The operational control 38 as shown in FIG. 8, includes a fluid piston device 118 having a piston rod extending downwardly therefrom to which the lifter element 36 is connected. The fluid-operated piston device 118 therefore displaces the lifter element between its two positions as illustrated in FIG. 8 by supply of fluid under pressure to opposite ends of the cylinder associated with the piston device. A pair of fluid pressure conduits 120 are connected to the piston device for this purpose. One of the conduits 120 is therefore supplied with fluid under pressure from a suitable source to which the supply conduit 122 is connected. A fluidic type of switching amplifier 124 is controlled by the trigger valve mechanism 114 in order to switch the flow of pressure fluid between the conduits 120. Fluidic amplifiers of this type are well known as disclosed for example in U.S. Pat. Nos. 3,275,016 and 3,393,692. Thus, each time the trigger valve mechanism 114 is engaged by the weighing-scale-actuating bar 112, it produces a signal pulse to cause switching of the fluid flow from one conduit 120 to the other resulting in upward displacement of the lifter element 36. After the bird is removed from the carrier assembly and the weighing scale returns to its normal position, the amplifier 124 returns to its initial state switching the flow of pressure fluid back to the other conduit so as to return the lifter element 36 to its lower position in preparation for another bird-releasing operation.

It will be apparent from the foregoing description, that the modular weight sorting assembly is supported by a frame consisting of three or more collar-shaped frame members 48, 50 and 52 which may be made of aluminum and interconnected by two stringers 54 as well as the track structure. A rugged platform is thereby established for weighing scale 102 constituting the article sensing mechanism or scale 102 controlling an operational device 38 through a fluidic amplifier type of control system. The modular assembly may be readily mounted in an aligned position while several of such modular assemblies may be joined to each other by means of dowels 126 and dowel holes formed in the end frame members for this purpose. The weighing scale 102 is supported across the stringers 54 by the fulcrum blocks 106 with the scale beams 108 disposed parallel to the line of travel of the carriers allowing the carriers to pass over the scale track sections 84 remaining always inside and equally spaced from the pivot elements 104 of the weighing scale to eliminate side thrust on the pivots and the need for extra check links. The vertically movable scale track sections 84 are limited in downward movement by the jumper sections 90 disposed below the gap in the horizontal track portion 70 while the limit pin 92 and slot 94 prevents the scale track sections from excessive lateral swing and drift toward the adjacent track sections while allowing for lateral side adjustment or centering. The cross-sectional curvature of the confronting edges of the movable scale track sections and the stationary track sections reduce friction of the flat wheels 42 and jumping as the wheels pass between the track sections.

Approach and departure of the carrier assemblies to the track arrangement is also accommodated in a tangle-free manner. Finally, by use of a clevis-type pulling link 40 on the carrier assembly, the rollers 42 are capable of tracking more evenly as the carrier travels along the track arrangement through the weighing station.

What is claimed as new is as follows:

1. In combination with a section of a conveyor from which article carriers are pivotally suspended, a sorting assembly installed about the conveyor comprising a frame assembly straddling the conveyor, track means mounted by the frame assembly in spaced relation below the conveyor, a means for rollingly supporting the article carriers on the track means only during movement through the frame assembly, transition means engageable by the rollingly supporting means for transferring the load of the article carriers between the conveyor and the track means, operational control means mounted on the frame assembly, article-sensing means mounted in alignment with the track means and triggering means engageable by the sensing means for actuating the operational control means.

2. The combination of claim 1 wherein said track means includes a load transfer track section disposed generally parallel to the conveyor, a vertically inclined transition section connected to at least one end of the load transfer section, each of said track sections having spaced track elements between which the article carriers depend, the track elements of the vertically inclined section having confronting notches.

3. The combination of claim 2 wherein the track means further includes a gap in the load transfer track section within which the vertically movable track section is disposed and jumper means connected to the load transfer section limiting downward movement of the vertically movable track section and maintaining structural continuity of the track means across said gap.

4. The combination of claim 3 including means mounted by the jumper means and engageable with vertically movable track sections for limiting lateral displacement thereof relative to the track means.

5. The combination of claim 1 wherein each of the article carriers includes a clevis element pivotally connected to the conveyor, said means rollingly supporting the carrier including a pair of rollers mounted by the clevis element for riding on top of the track means, a carrier shaft pivotally connected to the clevis element between the rollers, and an article release arm slidably mounted on the carrier shaft to be engaged by the operational control means below the track means, said notches in the track elements being dimensioned to permit downward movement of the release arm from a tangled position above the track means to an operative position below the track means for engagement by the operational control means.

6. The combination of claim 5 wherein the load transfer section and the vertically movable track section have roller supporting surfaces disposed in a common plane and closely spaced, confronting edge portions converging downwardly from the common plane.

7. The combination of claim 6 wherein said conveyor is supported by a plurality of vertically fixed columns, and means for adjustably mounting the sorting assembly comprising clamp members secured to at least two of the columns in vertically adjusted positions above the conveyor, mounting sleeves connected to the clamp members in parallel spaced relation on opposite lateral sides of the conveyor, generally horizontal supporting rods extending through said mounting sleeves between the clamp members, and means for suspending the frame assembly from the supporting rods.

8. The combination of claim 7 wherein the operational control means is a fluid-operated device, and a fluidic switching amplifier interconnects the triggering means with the fluid-operated device.

9. A sorting assembly adapted to be installed about a horizontal section of a conveyor from which article carriers are pivotally suspended, comprising a plurality of interconnected frame members straddling the conveyor, track means connected to the frame members in spaced relation below the conveyor for supporting the article carriers during movement through the frame members, operational control means mounted on one of the frame members laterally offset from the track means, article-sensing means mounted in alignment with the track means and triggering means mounted by another of the frame members for engagement by the sensing means to actuate the operational control means, said track means including a load transfer track section disposed generally parallel to the conveyor, vertically inclined approach and departure sections connected to opposite ends of the load transfer section, each of said track sections having spaced track elements between which the article carriers depend, the track elements of the vertically inclined sections having confronting notches.

10. The combination of claim 9 wherein the track means further includes a gap in the load transfer track section within which the vertically movable track section is disposed and jumper means connected to the load transfer section limiting downward movement of the vertically movable track section and maintaining structural continuity of the track means across said gap.

11. The combination of claim 10 including means mounted by the jumper means and engageable with vertically movable track sections for limiting lateral displacement thereof relative to the track means.

12. The combination of claim 11 wherein the load transfer section and the vertically movable track section have roller supporting surfaces disposed in a common plane and closely spaced, confronting edge portions converging downwardly from the common plane.

13. The combination of claim 9 wherein each of the article carriers includes a clevis element pivotally connected to the conveyor, a pair of rollers mounted by the clevis element for riding on top of the track means, a carrier shaft pivotally connected to the clevis element between the rollers, and an article release arm slidably mounted on the carrier shaft to be engaged by the operational control means below the track means, said notches in the track elements being dimensioned to permit downward movement of the release arm from a tangled position above the track means to an operative position below the track means for engagement by the operational control means.

14. A sorting assembly adapted to be installed about a horizontal section of a conveyor from which article carriers are pivotally suspended, comprising a plurality of interconnected frame members straddling the conveyor, track means connected to the frame members in spaced relation below the conveyor for supporting the article carriers during movement through the frame members, operational control means mounted on one of the frame members laterally offset from the track means, article-sensing means mounted in alignment with the track means and triggering means mounted by another of the frame members for engagement by the sensing means to actuate the operational control means, each of the article carriers including a clevis element pivotally connected to the conveyor, a pair of rollers mounted by the clevis element for riding on top of the track means, a carrier shaft pivotally connected to the clevis element between the rollers, and an article release arm slidably mounted on the carrier shaft to be engaged by the operational control means below the track means.

15. The combination of claim 14 wherein the operational control means is a fluid operated device, and a fluidic switching amplifier interconnects the triggering means with the fluid operated device.

16. A sorting assembly adapted to be installed about a horizontal section of a conveyor from which article carriers are pivotally suspended, comprising a plurality of interconnected frame members straddling the conveyor, track means connected to the frame members in spaced relation below the conveyor for supporting the article carriers during movement through the frame members, operational control means mounted on one of the frame members laterally offset from the track means, article-sensing means mounted in alignment with the track means and triggering means mounted by another of the frame members for engagement by the sensing means to actuate the operational control means, said conveyor being supported by a plurality of vertically fixed columns, and means for adjustably mounting the sorting assembly comprising clamp members secured to at least two of the columns in vertically adjusted positions above the conveyor, mounting sleeves connected to the clamp members in parallel spaced relation on opposite lateral sides of the conveyor, generally horizontal supporting rods extending through said mounting sleeves between the clamp members, and means for suspending at least two of the frame members from the supporting rods.

17. A sorting assembly adapted to be installed about a horizontal section of a conveyor from which article carriers are pivotally suspended, comprising a plurality of interconnected frame members straddling the conveyor, track means connected to the frame members in spaced relation below the conveyor for supporting the article carriers during movement through the frame members, operational control means mounted on one of the frame members laterally offset from the track means, article-sensing means mounted in alignment with the track means and triggering means mounted by another of the frame members for engagement by the sensing means to actuate the operational control means, said article sensing means including a vertically movable track section aligned with the track means, means pivotally suspending the track section from said one of the frame members, and a scale beam assembly connected to the pivotal suspending means extending generally parallel to the conveyor, said scale beam assembly including a pair of scale beam members, actuating means interconnecting the beam members adjacent to the other of the frame members for engaging the triggering means and a weight limit adjusting element movably mounted on each of the beam members.

18. In combination with a conveyor, an article-sizing assembly comprising track means, operational control means laterally offset from the track means, a vertically movable track section in alignment with the track means, article carriers suspended from the conveyor for movement along the track means and said vertically movable track section and triggering means responsive to displacement of the vertically movable track section by the article carriers for actuating the operational control means, said track means including a load transfer track section disposed generally parallel to the conveyor, vertically inclined approach and departure sections connected to opposite ends of the load transfer section, each of said track sections having spaced track elements between which the article carriers depend, the track elements of the vertically inclined sections having confronting notches.

19. The combination of claim 18 wherein each of the article carriers includes a clevis element pivotally connected to the conveyor, a pair of rollers mounted by the clevis element for riding on top of the track means, a carrier shaft pivotally connected to the clevis element between the rollers, and an article release arm slidably mounted on the carrier shaft to be engaged by the operational control means below the track means, said notches in the track elements being dimensioned to permit downward movement of the release arm from a tangled position above the track means to an operative position below the track means for engagement by the operational control means.

20. The combination of claim 18 wherein the track means further includes a gap in the load transfer track section within which the vertically movable track section is disposed and jumper means connected to the load transfer section limiting downward movement of the vertically movable track section and maintaining structural continuity of the track means across said gap.

21. The combination of claim 20 including means mounted by the jumper means and engageable with vertically movable track sections for limiting lateral displacement thereof relative to the track means.

22. The combination of claim 21 wherein the load transfer section and the vertically movable track section have roller supporting surfaces disposed in a common plane and closely spaced, confronting edge portions converging downwardly from the common plane.

23. The combination of claim 18 wherein the load transfer section and the vertically movable track section have roller supporting surfaces disposed in a common plane and closely spaced, confronting edge portions converging downwardly from the common plane.

24. In combination with a conveyor, an article sizing assembly comprising track means, operational control means laterally offset from the track means, a vertically movable track section in alignment with the track means, article carriers suspended from the conveyor for movement along the track means and said vertically movable track section and triggering means responsive to displacement of the vertically movable track section by the article carriers for actuating the operational control means, said track means including a load transfer track section disposed generally parallel to the conveyor, vertically inclined approach and departure sections connected to opposite ends of the load transfer section, each of said track sections having spaced track elements between which the article carriers depend, the load transfer track section having a gap within which the vertically movable track section is disposed and jumper means connected to the load transfer section limiting downward movement of the vertically movable track section and maintaining structural continuity of the track means across said gap.

25. The combination of claim 24 including means mounted by the jumper means and engageable with vertically movable track sections for limiting lateral displacement thereof relative to the track means.

* * * * *

Disclaimer 3,642,130.—*Paul J. Altenpohl*, Bryn Mawr, Pa. MODULAR WEIGHT SORTING ASSEMBLY FOR CONVEYORS. Patent dated Feb. 15, 1972. Disclaimer filed Feb. 3, 1978, by the assignee, *W. F. Altenpohl, Inc.*
Hereby enters this disclaimer to claims 1–3, 5–8, 14 and 24 of said patent.
[*Official Gazette March 28, 1978.*]